United States Patent
Wu et al.

(10) Patent No.: US 10,631,343 B2
(45) Date of Patent: Apr. 21, 2020

(54) TECHNIQUES FOR CONNECTION SETUP OF MMWAVE-BASED V2X COMMUNICATION SYSTEMS

(71) Applicant: QUALCOMM Incorporated, San Diego, CA (US)

(72) Inventors: Zhibin Wu, Sunnyvale, CA (US); Sudhir Kumar Baghel, Hillsborough, NJ (US); Shailesh Patil, San Diego, CA (US); Libin Jiang, Seattle, WA (US); Junyi Li, Chester, NJ (US); Kapil Gulati, Dover, DE (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/161,397

(22) Filed: Oct. 16, 2018

(65) Prior Publication Data

US 2019/0124698 A1  Apr. 25, 2019

Related U.S. Application Data

(60) Provisional application No. 62/574,600, filed on Oct. 19, 2017.

(51) Int. Cl.
*H04W 74/08* (2009.01)
*H04W 4/40* (2018.01)
(Continued)

(52) U.S. Cl.
CPC ..... *H04W 74/0841* (2013.01); *H04J 13/0062* (2013.01); *H04W 4/40* (2018.02);
(Continued)

(58) Field of Classification Search
CPC ... H04W 74/0841; H04W 4/40; H04W 8/005; H04W 64/003; H04W 74/0833; H04J 13/0062
See application file for complete search history.

(56) References Cited

U.S. PATENT DOCUMENTS

| | | | | |
|---|---|---|---|---|
| 2012/0300714 A1* | 11/2012 | Ng | ............ | H04W 56/0045 370/329 |
| 2014/0086176 A1* | 3/2014 | Liu | ............ | H04W 74/006 370/329 |

(Continued)

OTHER PUBLICATIONS

Huawei et al: "Analysis of RACH Procedural Steps," 3GPP Draft; R2-1702601, 3rd Generation Partnership Project (3GPP), Mobile Competence Centre; 650, Route Des Lucioles; F-06921 Sophia-Antipolis Cedex; France, vol. RAN WG2, No. Spokane, US; Apr. 3, 2017-Apr. 7, 2017, Apr. 3, 2017, XP051244603, 7 pages, Retrieved from the Internet: URL: http://www.3gpp.org/ftp/Meetings_3GPP_SYNC/RAN2/Docs/ [retrieved on Apr. 3, 2017].

(Continued)

*Primary Examiner* — Janice N Tieu
(74) *Attorney, Agent, or Firm* — Arent Fox LLP

(57) ABSTRACT

Various aspects described herein relate to techniques for connection setup procedures in a wireless communication system (e.g., a vehicle-to-everything (V2X) communication system in millimeter wave). In an aspect, the method includes identifying information for V2X communications, and initiating a random access procedure based on the identified information. The method further includes identifying one or more random access channel (RACH) resources based on the information, identifying one or more RACH response resources based on the one or more RACH resources, and performing directional communications using at least the one or more RACH resources or the one or more RACH response resources.

32 Claims, 6 Drawing Sheets

(51) Int. Cl.
  *H04J 13/00* (2011.01)
  *H04W 8/00* (2009.01)
  *H04W 64/00* (2009.01)
  *H04W 84/18* (2009.01)

(52) U.S. Cl.
  CPC ......... *H04W 8/005* (2013.01); *H04W 64/003* (2013.01); *H04W 74/0833* (2013.01); *H04W 84/18* (2013.01)

(56) References Cited

U.S. PATENT DOCUMENTS

| | | | | |
|---|---|---|---|---|
| 2015/0023281 A1* | 1/2015 | Wu | .................. | H04W 72/0473 370/329 |
| 2015/0333879 A1* | 11/2015 | Yang | ................. | H04W 56/0005 370/330 |
| 2018/0124829 A1* | 5/2018 | Lee | .......................... | H04L 5/00 |

OTHER PUBLICATIONS

Intel Corporation: "Corrections to Stage 2 Description of FeMTC and eNB-IoT," 3GPP Draft' 36300_CR0999R3_(REL-14)_R2-1706113, 3rd Generation Partnership Project (3GPP), Mobile Competence Centre; 550, Route Des Lucioles; F-06921 Sophia-Antipolis Cedex; France, vol. RAN WG2, No. Hangzhou, China; May 15, 2017-May 19, 2017, Jun. 5, 2017, XP051279620, 19 pages, Retrieved from the Internet: URL: http://www.3gpp.org/ftp/Meetings_3GPP_Sync/Ran/Docs/ [retrieved on Jun. 5, 2017].
International Search Report and Written Opinion—PCT/US2018/056197—ISA/EPO—dated Dec. 13, 2018 (176456WO).

* cited by examiner

TECHNIQUES FOR CONNECTION SETUP OF MMWAVE-BASED V2X COMMUNICATION SYSTEMS

CROSS-REFERENCE TO RELATED APPLICATION

This application claims the benefit of U.S. Provisional Application Ser. No. 62/574,600 entitled "TECHNIQUES FOR CONNECTION SETUP OF MMWAVE-BASED V2X COMMUNICATION SYSTEMS" and filed on Oct. 19, 2017, which is expressly incorporated herein in its entirety.

BACKGROUND

Aspects of the present disclosure relate generally to wireless communication systems, and more particularly, to techniques for vehicle-to-everything (V2X) communication systems in millimeter wave (mmWave or mmW).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. These multiple access technologies have been adopted in various telecommunication standards to provide a common protocol that enables different wireless devices to communicate on a municipal, national, regional, and even global level. An example telecommunication standard is the 4th Generation (4G), which includes Long Term Evolution (LTE) and/or LTE-Advanced (LTE-A). In addition, the 5th Generation (5G) New Radio (NR) communications technology, used in a wide range of spectrum, is envisaged to expand and support diverse usage scenarios and applications with respect to current mobile network generations.

V2X communications can be used when a vehicle communicates with one or more entities or devices that may affect the vehicle, and vice versa. In an example, V2X communication may incorporate a specific type of communications, such as vehicle-to-vehicle (V2V) communications. In some examples, mmWave communications in a V2X communication system may have different features and requirements compared with conventional communication systems. For example, omni-directional links may not be available in mmWave band(s) (e.g., 10 GHz through 100 GHz) because of the path loss. In omni-directional transmissions, the path loss may scale as $\lambda^2$, where $\lambda$ is the carrier wavelength. In this case, when a wireless communication system moves from 2.4 GHz to 60 GHz, the path loss will be very high. In some cases, the path loss may reach 28 dB or larger. As such, mmWave links may be inherently directional, and the range or coverage of mmWave communications may depend on the beam width or directivity of a perspective beam being used. For instance, by using more antenna elements, the beams may be narrower, and may reach further in distance or cover more areas compared with using less antenna elements.

Accordingly, due to the requirements for increased data rates, higher throughput, and higher system reliability, new approaches or procedures may be desirable to improve connection setup and random access procedure (e.g., in a mmWave-based V2X communication system), and enhance medium access, in order to satisfy consumer demand and improve user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect, a method related to connection setup and random access procedure in a wireless communication system (e.g., a vehicle-to-everything (V2X) communication system) is provided. The method may include identifying information for V2X communications. The method may further include initiating a random access procedure based on the identified information. The method may further include identifying one or more random access channel (RACH) resources based on the information. The method may further include identifying one or more RACH response resources based on the one or more RACH resources. The method may further include performing directional communications using at least the one or more RACH resources or the one or more RACH response resources.

In another, aspect, an apparatus for wireless communication is provided. The apparatus may include a transceiver, a memory configured to store instructions, and one or more processors communicatively coupled with the transceiver and the memory. The apparatus may include instructions executable by the one or more processors to identify information for V2X communications. The apparatus may further include instructions executable by the one or more processors to initiate a random access procedure based on the identified information. The apparatus may further include instructions executable by the one or more processors to identify one or more random access channel (RACH) resources based on the information. The apparatus may further include instructions executable by the one or more processors to identify one or more RACH response resources based on the one or more RACH resources. The apparatus may further include instructions executable by the one or more processors to perform directional communications using at least the one or more RACH resources or the one or more RACH response resources.

In another aspect, an apparatus for wireless communication is provided. The apparatus includes means for identifying information for V2X communications. The apparatus may further include means for initiating a random access procedure based on the identified information. The apparatus may further include means for identifying one or more random access channel (RACH) resources based on the information. The apparatus may further include means for identifying one or more RACH response resources based on the one or more RACH resources. The apparatus may further include means for performing directional communications using at least the one or more RACH resources or the one or more RACH response resources.

In another aspect, a computer-readable medium storing computer code executable by a processor for wireless communications. The computer-readable medium may include code to identify information for V2X communications. The computer-readable medium may further include code to initiate a random access procedure based on the identified information. The computer-readable medium may further include code to identify one or more random access channel (RACH) resources based on the information. The computer-readable medium may further include code to identify one or more RACH response resources based on the one or more RACH resources. The computer-readable medium may further include code to perform directional communications using at least the one or more RACH resources or the one or more RACH response resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
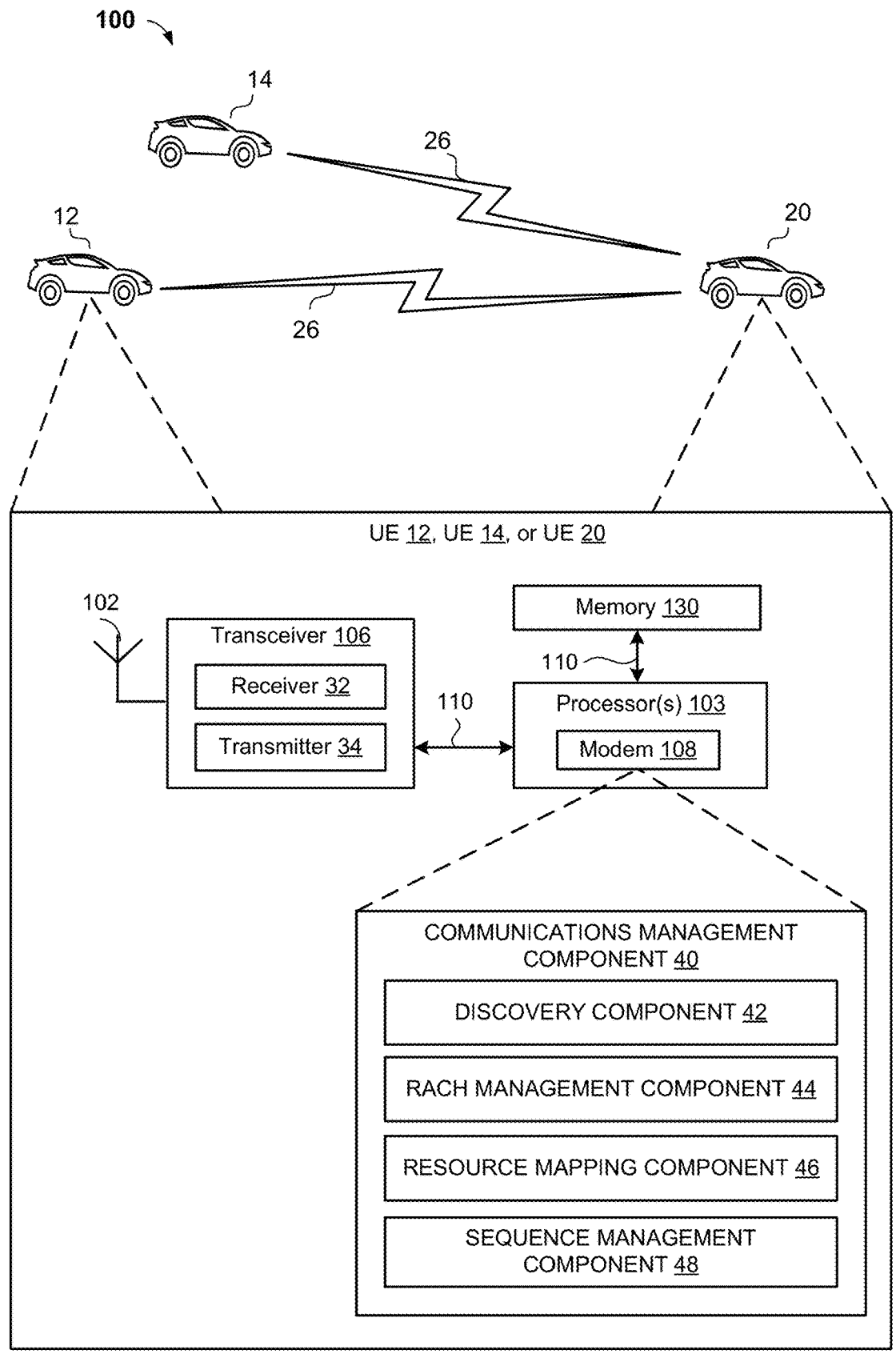
FIG. 1 is a block diagram illustrating an example of a wireless communication system (e.g., a vehicle-to-everything (V2X) communication system) including one or more user equipments (UEs) communicating with at least a target UE to perform connection setup and random access procedures, according to one or more of the presently described aspects.

In some wireless communication systems, major design components may include, for example, broadcast design, connection setup procedure, and/or unicast traffic scheduling. In an example, the broadcast design may be used for discovery procedure, which may be reused for data traffic. In some implementations, when performing a system-level design, proper techniques being used for sub-6 GHz operations, and proper schemes to work in a Non Stand-Alone (NSA) mode (e.g., coexistence with sub-6 GHz) may need to be considered.

For V2X or V2V communications, especially in mmWave band(s) (e.g., 10 GHz-100 GHz), the connection setup procedure may be a critical step to establish a V2X or V2V communication link after the directional discovery step. In some aspects, after the directional discovery step, the interested vehicle (e.g., a first user equipment (UE)) may initiate a random access process to communicate with a target vehicle (e.g., a second UE). In some examples, the discovery may be a one-way discovery, and the target vehicle may not be aware of the exact location of the interested vehicle that initiated the random access. As such, the target vehicle may not know the direction, from which the target vehicle can receive request(s) from the interested vehicle. In this case, there are some concerns on how to ensure the communication resource (e.g., time and frequency) used for the connection setup to be known to both the interested vehicle and the target vehicle, or how to solve multiplicity issues when there are multiple vehicles or UEs all transmitting from the same direction to reach the target vehicle or UE.

As such, new or improved approaches for connection setup of mmWave-based V2X or V2V communications may be desired in order to enhance physical layer and medium access procedures, as well as system reliability.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

Described herein are various aspects related to V2X communication systems, for example, a V2V communication system. In particular, the various aspects are related to techniques or procedures for connection setup of mmWave-based V2X communications. In some examples, very high throughput links may be established or utilized between vehicles (e.g., cars) for transporting large amounts of data (e.g., camera feeds). These high throughput links (e.g., continuous video streaming between the vehicles) may demand or use high-data rate mmWave links. In some examples, the view of a vehicle may be blocked by, for example, another vehicle ahead or behind the vehicle. In some aspects, mmWave designs in the Fifth Generation (5G) New Radio (NR) may not be reused or applied to V2X communications, because, for example, V2X scenarios may need to work in out-of-coverage cases where cells or gNBs may not be involved or available. For example, V2X or V2V communications may be considered as device-to-device (D2D) or ad-hoc communications. In some examples, discovery may be used as part of the design for D2D communications such as LTE-direct. In some cases, high-speed vehicle(s) may be difficult to manage with conventional cell handoff procedures. As such, new or improved approaches for connection setup of mmWave-based V2X communications may be desired.

In some implementations, two different operation modes may be used in V2X communications. One operation mode is proactive mode. In some examples, the proactive mode may maintain highly directional links between a vehicle and one or more neighbor vehicles so that data transport may be started promptly, and with high-data rate(s). In an aspect, the proactive mode may be used to keep tracking and to refine beams as the vehicle moves. In an example, the proactive mode may be used when there is no active data sessions. In some examples, in proactive mode, a vehicle may actively use discovery to detect or locate other vehicle(s) in proximity to the vehicle. In some cases, in proactive mode, a vehicle may mainly use unicast communications.

In some aspects, the other operation mode, reactive mode, may be used in V2X communications. In some examples, a vehicle may not have associated topology maintained. For on-demand traffic, the vehicle may choose to establish one or more links (e.g., one-time broadcast) and transport using a directional link (e.g., one of the established link(s)). In some implementations, depending on the range requirement and/or traffic or data amounts, the vehicle may use a link with either a wide beam or a narrow beam. In an example, the vehicle may release the link after traffic is stopped. In some aspects, both unicast and broadcast traffic may be utilized. In some cases, the vehicle may use on-demand discovery to detect location with interests (e.g., sensor interests).

In some aspects, after a discovery step, an initiating UE may perform handshake(s) with a target UE. For example, the initiating UE may discover or find the target UE from broadcast signals or beams sent from the target UE, and then the initiating UE may try to reach the target UE. In another example, the initiating UE may identify the target UE based on predetermined information (e.g., information or schemes stored at the initiating UE). In an example, after discovery, the initiating UE or an interested node may initiate random access (e.g., via a random access channel (RACH)) to the target UE. In some aspects, one or more directional antennas may be used in V2X communications, for example, for discovery and/or RACH procedure(s). In an implementation of one-way discovery, the target UE may not know where the initiating UE is. As a result, the target UE may not know which direction the target UE should expect to receive a request from the initiating UE. In this case, in RACH resource, the target UE may announce or transmit some information in the discovery phase, and listen to all directions in turn (e.g., in multiple slots) to check whether there is any RACH message. In some cases, resource timing between the initiating UE and the target UE may need to be considered. For example, the initiating UE may need to know the time when the target UE receives the connection request sent from the initiating UE.

In some examples, the initiating UE may use a discovery and/or a RACH procedure to obtain or identify information for directional V2X communications. For example, the information may include the property, characteristic and/or identifier of the target UE or vehicle, the directivity of a broadcast or discovery signal, and/or the direction(s) to reach the target UE or vehicle.

In some examples, multiplicity among multiple initiating UEs and the target UE may need to be considered. For example, there may be multiple UEs transmitting from the same direction trying to reach the same target UE. In this case, multiple RACH resource allocations may be applied and the RACH resources may be limited, and interference among the multiple UEs may need to be considered. In some examples, a respective transmission (TX) identification (ID) may be used for each initiating UE, and may be included in transmitted symbols. In some cases, the target UE may extract the TX ID to identify a respective initiating UE from multiple initiating UEs that are transmitting from the same direction and/or at the same time. In some examples, the target UE may be in the proximity of one or more initiating UEs.

Figure 5:
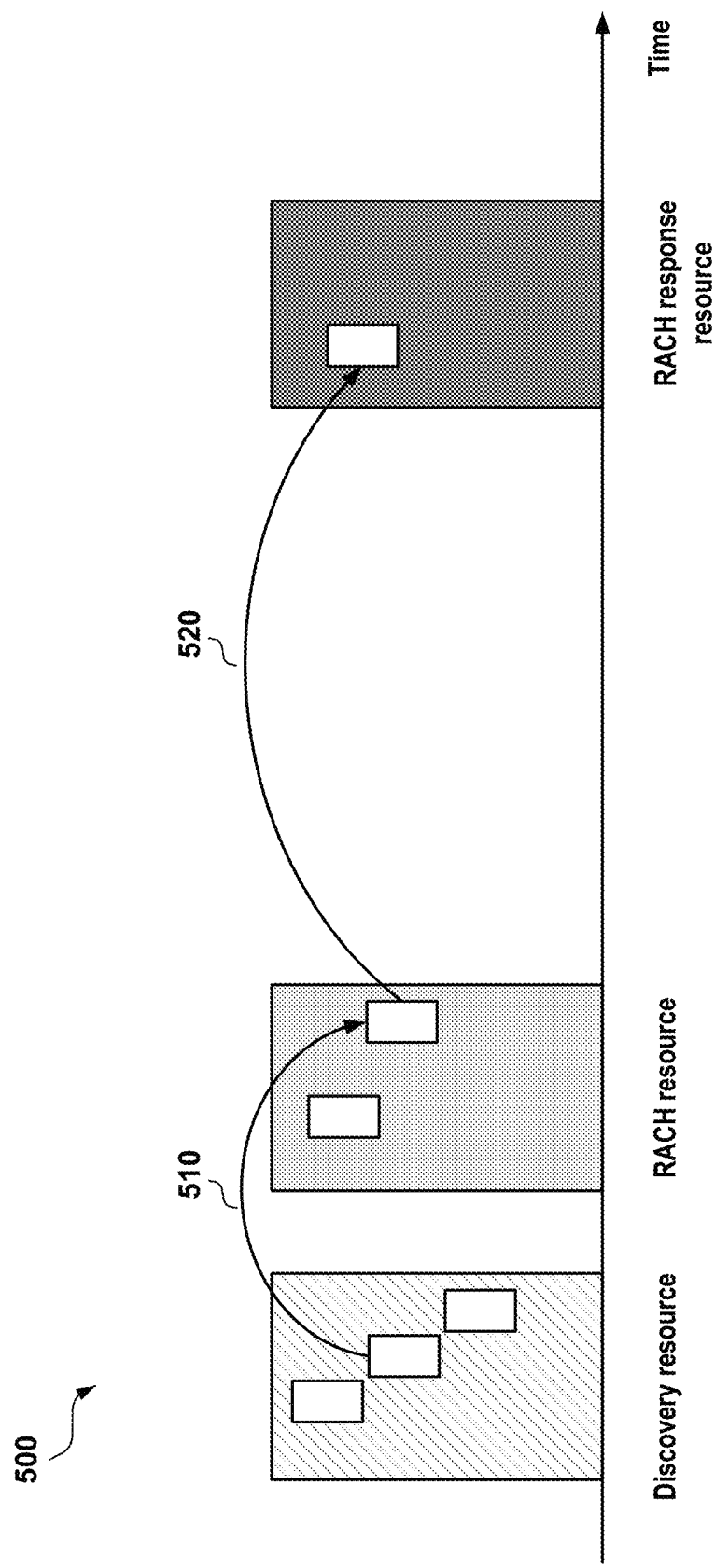
FIG. 5 is an example of random access resource allocations with resource mapping in V2X communications, according to one or more of the presently described aspects.

In some aspects, RACH resource allocations and procedures may be based on or associated with discovery that is discussed above. In an example, one or more RACH resource locations may be derived based on the content(s) of a discovery message or signal (e.g., a Discovery Msg) broadcasted by the target UE, with an algorithm known by one or more UEs, or all UEs. In an aspect, many-to-one mapping between discovery resources and RACH resources may be used. In another aspect, one-to-one mapping between RACH resources and RACH response resources may be utilized. One example of the resource mapping is shown in FIG. 5. In some cases, the number of discovery resources may be larger than the number of RACH resources, and the number of RACH resources may be equal or larger than the number of RACH response resources.

In some examples, when RACH procedures or connections have been setup, collisions may occur in the RACH communications. For example, a single RACH resource may be used by multiple initiating UEs. In this case, to reduce or avoid collisions, each transmitting (TX) vehicle may use an orthogonal sequence (e.g., a Zadoff-Chu (ZC) sequence used in LTE) and/or different code(s) in transmit symbol(s), and the receiving (RX) vehicle may detect the existence of one or more TX vehicles. In an example, the sequence chosen by the TX vehicle may be indexed, and the index may be linked to a different "rendezvous" resource(s) for message-based handshake.

In some aspects, further message exchanges may be applied between an initiating UE (or vehicle) and a target UE (or vehicle). For example, beam alignment may be used after initial discovery. In an aspect, the initiating UE and the target UE may exchange position information and/or trajectory estimation. In some examples, a RACH response may contain a ZC-ID and/or the ID of the initiating UE. In some cases, for each direction, the initiating UE and/or the target UE may use a different ZC sequence, and/or the best beam (1, 2, . . . M), where M is the number of beam directions to be supported by the UE antenna(s). In some examples, RACH message(s) may contain one or more additional bits (e.g., in addition to the ZC sequence or preamble) to show the best beam that may be used by the initiating UE to reach the target UE. In an aspect, the initiating UE may support one or more beam-sweeping patterns from the target UE. For example, the target UE may transmit and/or receive beams in 8 different directions in the discovery phase. In an aspect, the initiating UE may detect the target UE in one out of the 8 different directions (e.g., one direction with the maximum signal strength out of the 8 different directions). In some cases, the initiating UE may support up to 12 beam directions, and the best beam perceived by the initiating UE may not be the one of the 8 directions where the target UE is currently listening or monitoring for RACH request(s).

In another example, the sender (e.g., the initiating UE or the target UE) of the RACH message may be configured to use a comparatively wider beam to increase the chance of the receiver (e.g., the target UE or the initiating UE) to capture the beam, due to the potential mobility between the sender and the receiver (or the initiating UE and target UE). In an aspect, using a wider beam may reduce signal-to-interference and noise ratio (SINR) of the signal at the same distance compared with using a narrower beam. In an example, the sender may be aware that a message or signal itself can be decoded in a low-SINR environment (e.g., containing less information bits in the message or signal), and in some cases, the best beam may still be included in the message, and the receiver may know the perception of a proper narrow beam that the sender wants to use to reach the receiver.

In some aspects, when transmitting a symbol, the initiating UE and/or the target UE may encode a few bits. For example, the initiating UE and/or the target UE may use and/or transmit a single sequence, or a sequence with a few bits. In some examples, the sequence may be a ZC sequence, and may not have any data information. In some examples, absolute orthogonality and information-carrying capability may be considered when performing multi-user detection. In an aspect, the receiver (at the initiating UE or the target UE) may detect the existence of a ZC sequence and obtain the corresponding ZC ID. For example, the receiver may identify the ZC sequence as one out of a plurality of pre-configured ZC sequences. In some cases, if there are two or more different ZC sequences received simultaneously, the receiver may decode each of the ZC sequences where the different ZC sequences may be orthogonal. In an implementation, if the chance of multi-user presence is low (e.g., a single-user case), sending only the ZC sequence(s) may waste resource(s). In this case, the sender (at the initiating UE or the target UE) may encode a couple of bits as additional information (e.g., in addition to a ZC sequence) to improve information-carrying capability.

Each of the aspects described above may be performed or implemented in connection with FIGS. 1-6, which are described in more detail below.

Referring to FIG. 1, in an aspect, a wireless communication system 100 includes at least a UE 12 or UE 14 in communication coverage of at least a UE 20. In some examples, the UE 12 or UE 14 may be referred to as an initiating UE in a vehicle (or being attached to the vehicle or being associated with the vehicle), and the UE 20 may be referred to as a target UE in another vehicle (or being attached to another vehicle or being associated with the vehicle). In an aspect, the initiating UE 12 or UE 14 may communicate with the target UE 20 directly using beamforming. For example, the initiating UE 12 or UE 14 may communicate with the target UE 20 via device-to-device or ad-hoc communications. In some aspects, multiple initiating UEs including the UE 12 and/or UE 14 may be in communication coverage with one or more target UEs, including the UE 20. In an example, the initiating UE 12 or UE 14 may transmit and/or receive wireless communications (e.g., beams for discovery or RACH procedure) to and/or from the target UE 20. For example, the initiating UE 12 or 14 may be actively communicating with the target UE 20, for example, to perform connection setup or RACH procedures.

In some aspects, the UE 12, 14, or 20 may also be referred to by those skilled in the art (as well as interchangeably herein) as a vehicle (or inside a vehicle), a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. The UE 12, 14, or 20 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for Internet of Things (IoT), or any other similar functioning device.

According to the present aspects, the UE 12, 14, or 20 may include one or more processors 103 and a memory 130 that may operate in combination with a communications management component 40. The communications management component 40 may include a discovery component 42, RACH management component 44, resource mapping component 46, and/or sequence management component 48.

In some examples, the communications management component 40 may be configured to perform one or more connection setup or RACH procedures as discussed herein. In an aspect, the discovery component 42 may be configured to broadcast or receive one or more discovery messages. In an aspect, the RACH management component 44 may be configured to perform RACH resource allocations and related procedures, for example, RACH request or RACH response. In another aspect, the resource mapping component 46 may be configured to map the resources among discovery resources, RACH resources, and RACH response resources. The sequence management component 48 may be configured to determine or identify the sequence(s) being used in the resources.

In some aspects, the communications management component 40 may be communicatively coupled with a transceiver 106, which may include a receiver 32 for receiving and processing radio frequency (RF) signals (e.g., broadcast signals, directional beam signals, or RACH signals), and a transmitter 34 for processing and transmitting RF signals (e.g., broadcast signals, directional beam signals, or RACH signals). The processor 103 may be communicatively coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, an RF receiver. In an aspect, the receiver 32 may receive signals transmitted by the UE 12, UE 14, and/or UE 20. The receiver 32 may obtain discovery signals and/or measurements of the signals. For example, the receiver 32 may obtain signal measurements, and may be communicatively coupled with the processor(s) 103 and assist the processor(s) 103 to determine signal-to-noise ratio (SNR), Reference Signal Received Power (RSRP), Reference Signal Received Quality (RSRQ), Received Signal Strength Indicator (RSSI), etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 may include a modem 108 that uses one or more modem processors. The various functions related to the communications management component 40 may be included in the modem 108 and/or processor(s) 103 and, in an aspect, may be executed by a single processor, while in other aspects, different ones of the functions may be executed by a combination of two or more different processors. For example, in an aspect, the one or more processors 103 may include any one or any combination of a modem processor, or baseband processor, or digital signal processor, or transmit processor, or transceiver processor associated with the transceiver 106. In particular, the one or more processors 103 may implement components included in the communications management component 40, including the discovery component 42, RACH management component 44, resource mapping component 46, and/or sequence management component 48.

The communications management component 40, discovery component 42, RACH management component 44, resource mapping component 46, and/or sequence management component 48, may include hardware, firmware, and/or software code executable by a processor for performing connection setup, RACH procedures and related operations in V2X or V2V communications. For example, the hardware may include, for example, a hardware accelerator, or specialized processor. In an aspect, the term "component" as used herein may be one of the parts that make up a system, may be hardware, firmware, and/or software, and may be divided into other components.

Moreover, in an aspect, the UE 12 may include an RF front end (not shown) and the transceiver 106 for receiving and transmitting radio transmissions, for example, wireless communications 26. For example, transceiver 106 may transmit or receive one or more signals. The transceiver 106 may measure a received pilot signal in order to determine signal quality (e.g., based on RSRP, RSRQ, or RSSI) and for providing feedback. For example, the transceiver 106 may communicate with the modem 108 to transmit messages generated by the communications management component 40 and to receive messages and forward them to the communications management component 40.

The RF front end may be communicatively coupled with one or more antennas 102 and may include one or more low-noise amplifiers (LNAs), one or more switches, one or more power amplifiers (PAs), and one or more filters for transmitting and receiving RF signals (e.g., beam signals). In an aspect, the components of the RF front end may be communicatively coupled with the transceiver 106 (e.g., via one or more communication links or buses 110). The transceiver 106 may be communicatively coupled with one or more modems 108 and/or processor 103.

In an aspect, the LNA may amplify a received signal at a desired output level. In an aspect, each LNA may have a specified minimum and maximum gain values. In an aspect, the RF front end may use one or more switches to select a particular LNA and a specified gain value based on a desired gain value for a particular application. In an aspect, the RF front end may provide measurements (e.g., Ec/Io) and/or applied gain values to the communications management component 40.

The one or more PA(s) may be used by the RF front end to amplify a signal for an RF output at a desired output power level. In an aspect, each PA may have a specified minimum and maximum gain values. In an aspect, the RF front end may use one or more switches to select a particular PA and a specified gain value of the PA based on a desired gain value for a particular application.

The one or more filters may be used by the RF front end to filter a received signal to obtain an input RF signal. Similarly, in an aspect, for example, a respective filter may be used to filter an output from a respective PA to produce an output signal for transmission. In an aspect, each filter may be communicatively coupled with a specific LNA and/or PA. In an aspect, the RF front end may use one or more switches to select a transmit or receive path using a specified filter, LNA, and/or PA, based on a configuration as specified by the transceiver 106 and/or processor 103.

The transceiver 106 may be configured to transmit and receive wireless signals through an antenna 102 via the RF front end. In an aspect, the transceiver 106 may be tuned to operate at specified frequencies such that the UE 12 or UE 14 may communicate with, for example, the UE 20. In an aspect, for example, the modem 108 may configure the transceiver 106 to operate at a specified frequency and power level based on the UE configuration of the UE 12, UE 14, and/or UE 20, and communication protocol used by the modem 108.

In an aspect, the modem 108 may be a multiband-multimode modem, which may process digital data and communicate with the transceiver 106 such that the digital data is sent and received using the transceiver 106. In an aspect, the modem 108 may be multiband and be configured to support multiple frequency bands for a specific communications protocol. In an aspect, the modem 108 may be multi-mode and be configured to support multiple operating networks and communications protocols. In an aspect, the modem 108 may control one or more components of the UE 12, UE 14, or UE 20 (e.g., RF front end, transceiver 106), to perform connection setup and RACH procedures in V2X or V2V communications, or enable transmission and/or reception of signals based on a specified modem configuration. In an aspect, the modem configuration may be based on the mode of the modem and the frequency band in use. In another aspect, the modem configuration may be based on UE configuration information associated with the UE 12, UE 14, or UE 20.

In some aspects, the UE 12, UE 14, or UE 20 may further include memory 130, such as for storing data used herein and/or local versions of applications or the communications management component 40 and/or one or more subcomponents of the communications management component 40 being executed by the processor(s) 103. The memory 130 may include any type of computer-readable medium usable by a computer or processor(s) 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining communications management component 40 and/or one or more of the subcomponents of the communications management component 40, and/or data associated therewith, when the UE 12, UE 14, or UE 20 is operating the processor(s) 103 to execute the communications management component 40 and/or one or more subcomponents of the communications management component 40. In another aspect, for example, the memory 130 may be a non-transitory computer-readable storage medium.

Figure 2:
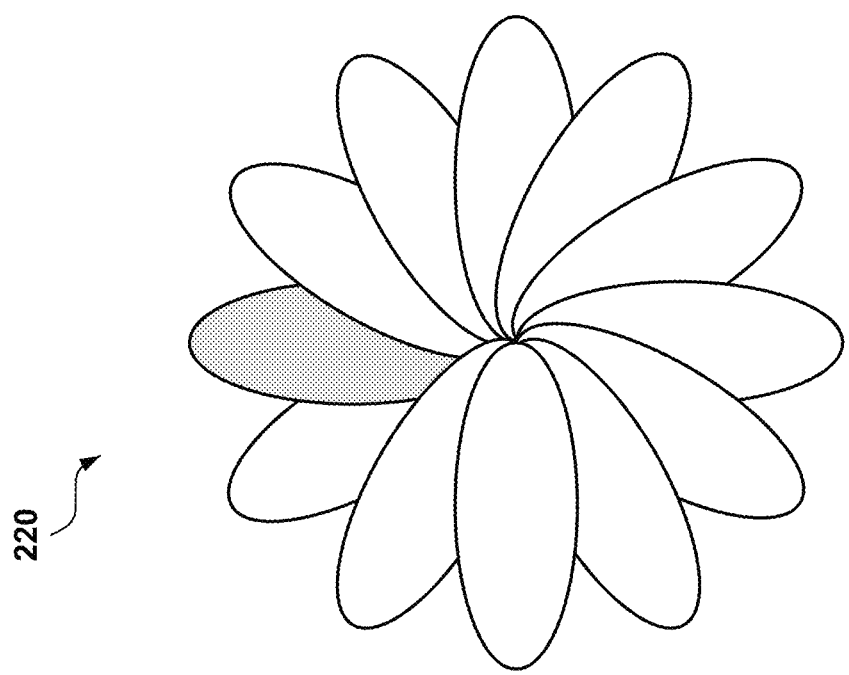
FIG. 2 includes two examples of beam patterns used in millimeter wave (mmWave) communications, according to one or more of the presently described aspects.
Figure 2:
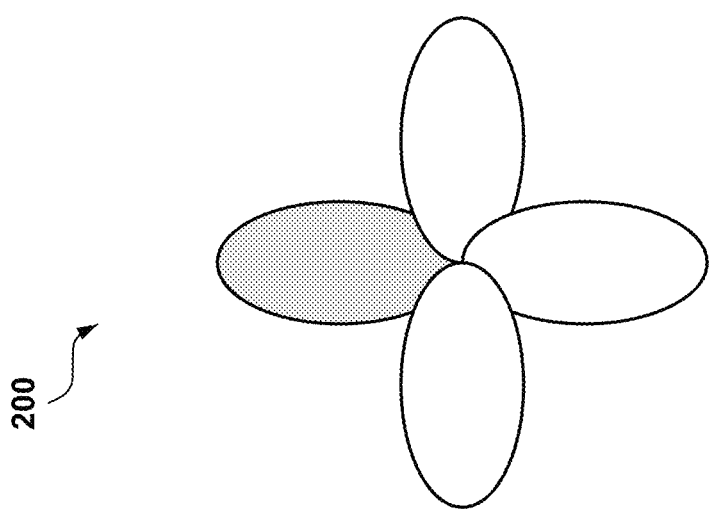

Referring to FIG. 2, two examples of beam patterns used in mmWave communications in accordance with aspects described herein are presented. In some aspects, mmWave communications, such as the wireless communications 26 in FIG. 1, may operate at a frequency band from 10 GHz to 100 GHz. In some examples, mmWave links may be inherently directional. As shown in beam pattern 200 and beam pattern 220, the range of mmWave communications (e.g., the wireless communications 26 in the wireless communication system 100) may depend on the beam widths or directivity. For example, beam pattern 200 has coarse or wide beams (e.g., number of beam directions=4), using a small number of antenna elements, the beams may get wider but the distance is limited. In another example, beam pattern 220 has fine or narrow beams (e.g., the number of beam directions=12), and by using more antenna elements, the beams may get narrower but longer distance can be reached compared to the beam pattern 200. In some cases, the energy consumption or power budget is related to the beam widths that can be used.

In some aspects, path loss between a transmitter and a receiver may not change as a function of frequency, as long as the effective aperture of the transmitting and receiving antennas does not change. In some examples, the antenna aperture does reduce in proportion to the square of the frequency, and the reduction may be compensated by using higher antenna directivity.

Figure 3:
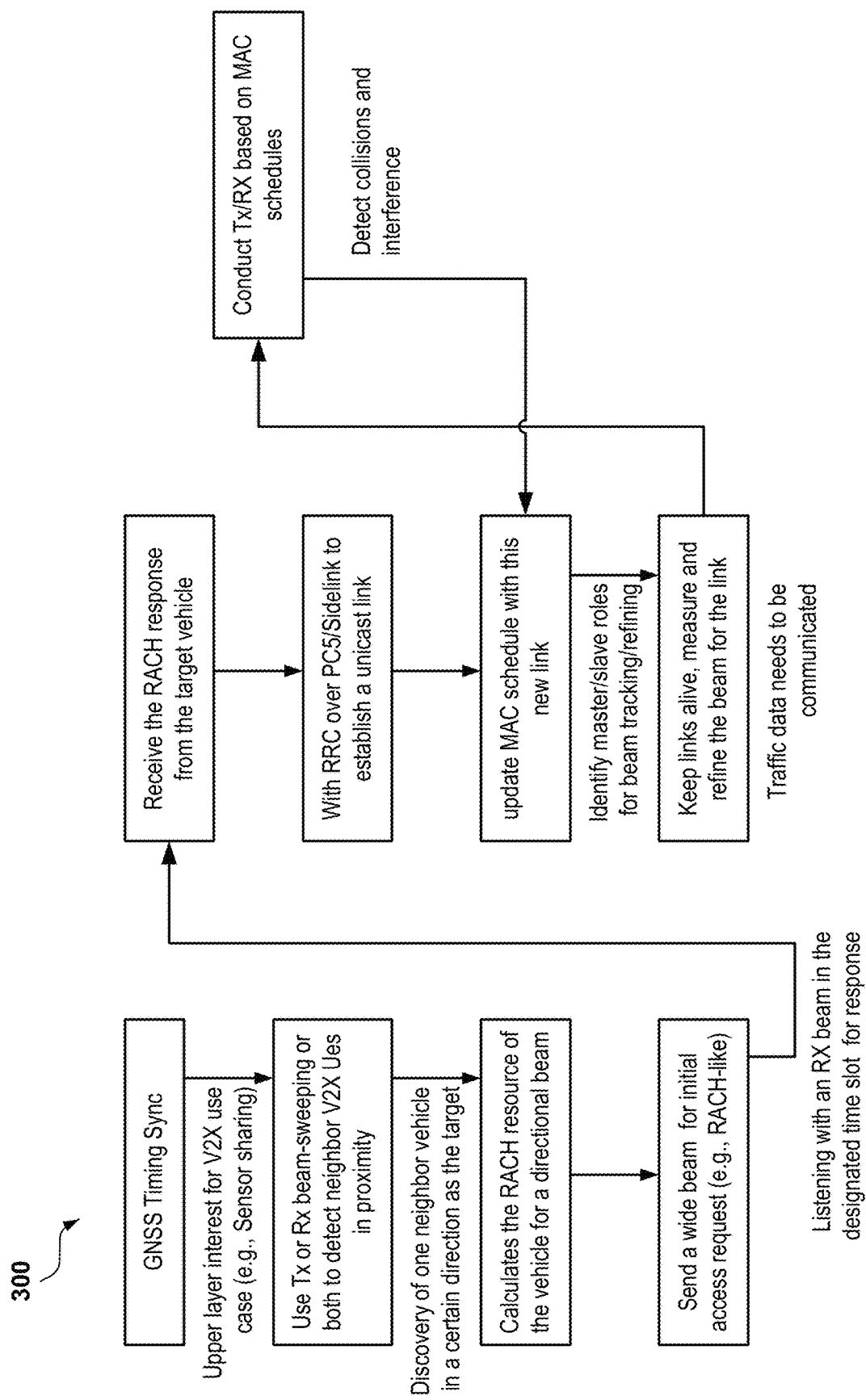
FIG. 3 is a flow chart illustrating an example of an mmWave-based V2X communication procedure, according to one or more of the presently described aspects.

Referring to FIG. 3, a flow chart illustrating an example of a mmWave V2X procedure 300 that can be used in, for example, the wireless communication system 100. In an aspect, the mmWave V2X procedure 300 may start with a timing synchronization, for example, via a Global Navigation Satellite System (GNSS) or a Global Positioning System (GPS). If an upper layer determines there are potential or existing V2X communications (e.g., sensor sharing), UE 12 or UE 14 may use transmission or reception beam-sweeping (or both) to detect neighbor V2X UEs in proximity to the UE 12 or UE 14. In an aspect, when discovery of a neighbor vehicle (e.g., a target UE, or UE 20) in a certain direction as the target is performed (by initiating UE 12 or UE 14), the initiating UE 12 or UE 14 may calculate the RACH resources of the neighbor vehicle for a directional beam, and then send a wide beam with an initial access request (e.g., RACH-like) to the target vehicle (e.g., UE 20). After sending the initial access request, the initiating UE 12 or UE 14 may listen or monitor for a RX beam for a response in a designated time slot. In some examples, the initiating UE 12 or UE 14 may receive a RACH response from the target vehicle, e.g., UE 20, to establish a unicast link with at least a Radio Resource Control (RRC) message over PC5 (a one-to-many communication interface) or sidelink at the physical layer, and update Medium Access Control (MAC) schedule with this new unicast link. In some examples, the initiating UE 12 or UE 14 may identify master or slave roles for beam tracking or refining, keep link(s) alive, and measure and/or refine the beam for the link(s). When traffic data needs to be communicated, the UE 12 and/or UE 14 (or UE 20) may conduct or perform transmission or reception based on the MAC schedules. In some cases, when the UE 12 (or UE 14, UE 20) detects collisions and/or interference, the UE 12 (or UE 14, UE 20) may update MAC schedule accordingly.

Figure 4:
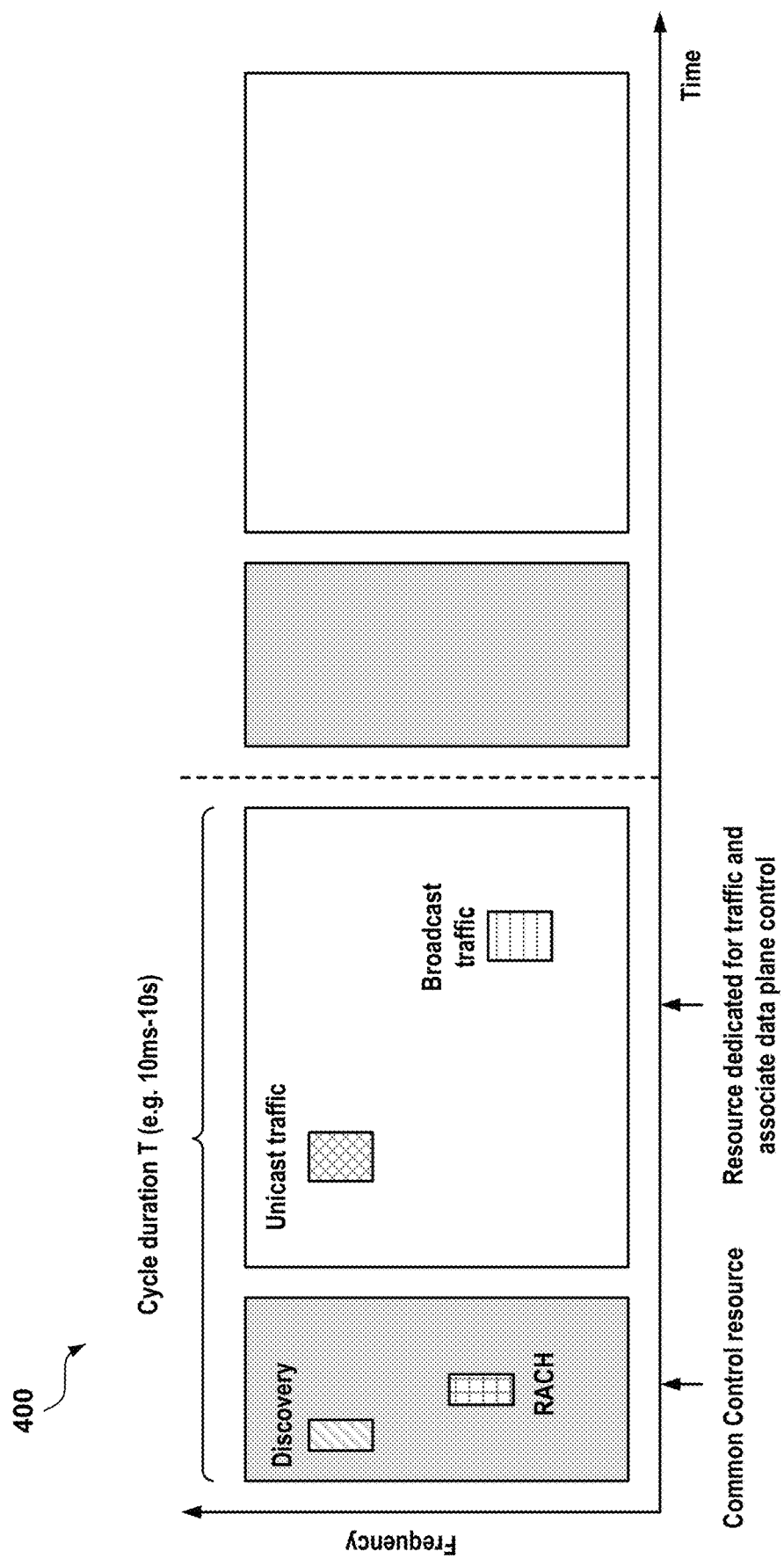
FIG. 4 is an example of a frame structure used for resource allocations and usage in V2X communications, according to one or more of the presently described aspects.

Referring to FIG. 4, in an aspect, a UE (e.g., UE 12, 14 or 20 in FIG. 1) may allocate or use resources based on a predetermined frame structure. For example, as shown in FIG. 4, the UE may use a frame structure 400 for resource allocations or usage. In some implementations, the UE may use a 5G frame structure as a basis, for example, with flexible numerology, and/or flexible Transmission Time Intervals (TTIs). In some examples, around 10% of the resources may be shared or used for discovery, RACH procedure, broadcast and slow-loop control, and 90% of the resources may be used for unicast traffic and associated traffic management signaling. In some cases, resources may be repeated (e.g., in frame cycles) as shown in FIG. 4. In an example, a cycle duration may be ten milliseconds to ten seconds (10 ms-10 s), and may include common control resources and resources dedicated for traffic and/or associate data plane control. In an example, the common control resources may include discovery and/or RACH resources, and the resources dedicated for traffic may include unicast traffic and/or broadcast traffic.

Referring to FIG. 5, in an aspect, an example of a RACH resource allocation scheme 500 with resource mapping is illustrated. In an example, one or more RACH resource locations may be derived (e.g., via arrows 510 and/or 520) based on the content(s) of a discovery message or signal (e.g., a Discovery Msg) broadcasted by the target UE, with an algorithm known by one or more UEs, or all UEs. In an aspect, many-to-one mapping between discovery resources and RACH resources may be used. For example, via arrow 510, resource mapping component 46 may be configured to map one or more discovery resources in the discovery message to one of the RACH resources. In another aspect, one-to-one mapping between RACH resources and RACH response resources may be utilized. For example, via arrow 520, the resource mapping component 46 may be configured to map each of the RACH resources to one of the RACH response resources. In some cases, the number of discovery resources may be larger than the number of RACH resources, and the number of RACH resources may be equal or larger than the number of RACH response resources.

Figure 6:
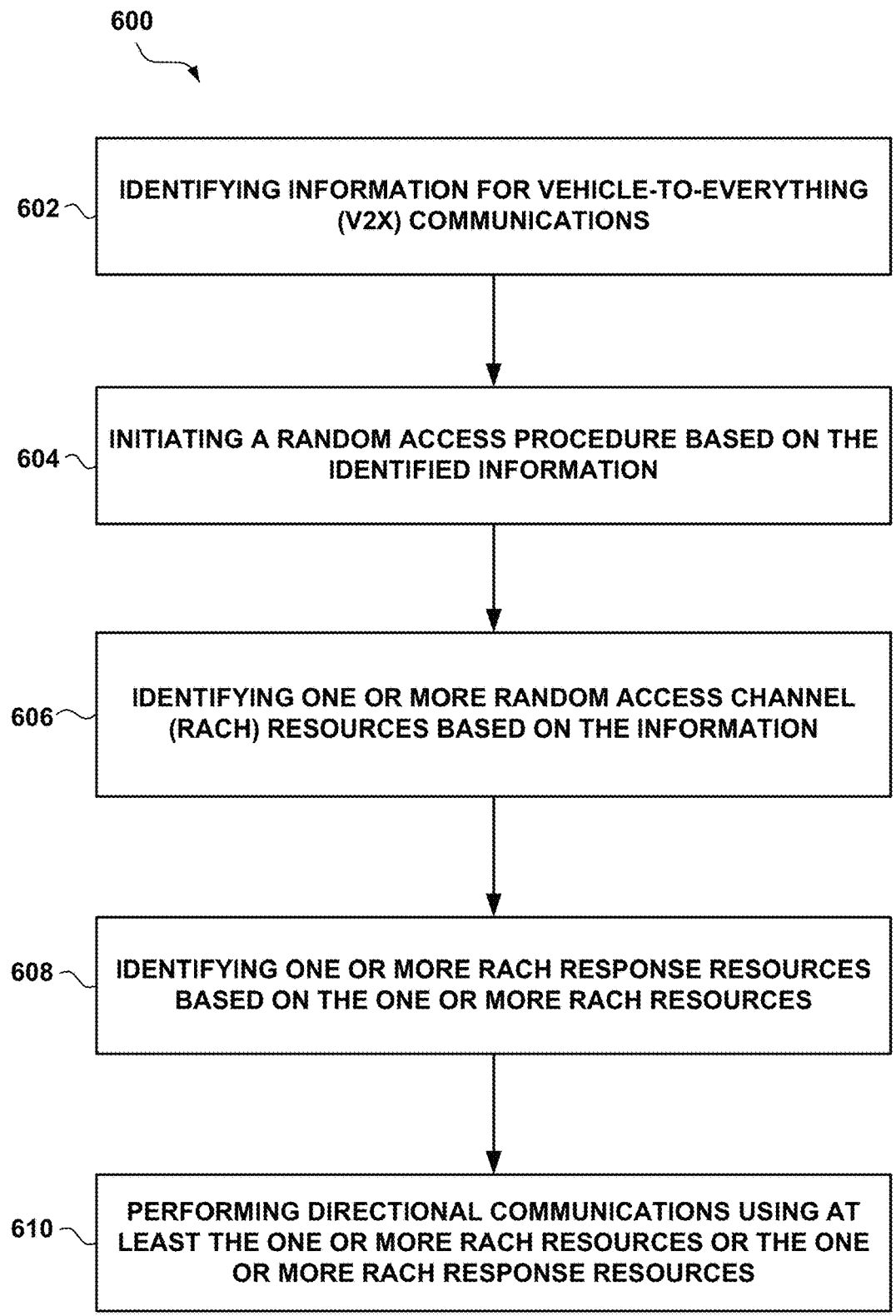
FIG. 6 is a flow chart of an example method for connection setup procedure in V2X communications, according to one or more of the presently described aspects.

Referring to FIG. 6, in an operational aspect, a UE, such as UE 12, UE 14, or UE 20 in FIG. 1, may perform one or more aspects of a method 600 for managing connection setup in a wireless communication system (e.g., an mmWave-based V2X communication system). For example, one or more of the processors 103, memory 130, modem 108, transceiver 106, communications management component 40, discovery component 42, RACH management component 44, resource mapping component 46, and/or sequence management component 48, may be configured to perform aspects of the method 600.

In an aspect, at block 602, the method 600 may include identifying information for V2X communications. In an aspect, for example, the communications management component 40, e.g., in conjunction with one or more of the processors 103, memory 130, modem 108, and/or transceiver 106, may be configured to identify information for V2X communications. For example, the information may include one or more discovery resources, RACH resources mapping information, the property, characteristic and/or identifier of a target UE, the directivity of a broadcast or discovery signal, and/or the direction(s) to reach the target UE. In some cases, the information may be received (e.g., via transceiver 106) in a broadcast or discovery message, or predetermined by an initiating UE (e.g., via one or more of the processors 103 at UE 12).

In an aspect, at block 604, the method 600 may include initiating a random access procedure based on the identified information. In an aspect, for example, the communications management component 40, discovery component 42, RACH management component 44, e.g., in conjunction with one or more of the processors 103, memory 130, modem 108, and/or transceiver 106, may be configured to initiate a RACH procedure based on the identified information. In an example, the RACH procedure is initiated in response to receiving a discovery message.

In another aspect, at block 606, the method 600 may include identifying one or more RACH resources based on the information. In an aspect, for example, the communications management component 40, discovery component 42, RACH management component 44, resource mapping component 46, e.g., in conjunction with one or more of the processors 103, memory 130, modem 108, and/or transceiver 106, may be configured to identify RACH resources based on the identified information (e.g., in a received discovery message). In some examples, the resource mapping component 46 may be configured to map discovery resources in the discovery message to the RACH resources. In an aspect, the RACH management component 44 and/or resource mapping component 46 may be configured to identify the location of each RACH resource based on the identified information (e.g., in a received discovery message).

In an aspect, at block 608, the method 600 may include identifying one or more RACH response resources based on the one or more RACH resources. In an aspect, for example, the communications management component 40, RACH management component 44, resource mapping component 46, e.g., in conjunction with one or more of the processors 103, memory 130, modem 108, and/or transceiver 106, may be configured to identify RACH response resources based on the identified RACH resources at block 606. In some examples, the resource mapping component 46 may be configured to map each of the RACH resources to one of the RACH response resources.

In another aspect, at block 610, the method 600 may include performing directional communications using at least the one or more RACH resources or the one or more RACH response resources. In an aspect, for example, the communications management component 40, sequence management component 48, e.g., in conjunction with one or more of the processors 103, memory 130, modem 108, and/or transceiver 106, may be configured to perform directional communications using the identified RACH resources at block 606 and/or the identified RACH response resources at block 608. In some examples, the communications management component 40 and/or sequence management component 48 may be configured to receive a RACH response using at least one of the RACH response resources, and the RACH response comprises at least a Zadoff-Chu (ZC) sequence identification (ID) and an initiating UE ID.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a wireless communication system have been presented with reference to a V2X or V2V system. As those skilled in the art will readily appreciate, various aspects described throughout this disclosure may be extended to other communication systems (e.g., 5G New Radio (NR)), network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims.

What is claimed is:

1. A method of wireless communications, comprising:
   identifying information for vehicle-to-everything (V2X) communications;

initiating a random access procedure based on the identified information;
identifying one or more random access channel (RACH) resources based on the information;
identifying one or more RACH response resources based on the one or more RACH resources; and
performing directional communications using at least the one or more RACH resources or the one or more RACH response resources.

2. The method of claim 1, wherein the identifying information comprises identifying one or more discovery resources.

3. The method of claim 2, wherein the identifying the one or more RACH resources comprises mapping the one or more discovery resources to the one or more RACH resources.

4. The method of claim 2,
wherein the number of the one or more discovery resources is at least two and is more than the number of the one or more RACH resources, and
wherein the number of the one or more RACH resources is equal to or more than the number of the one or more RACH response resources.

5. The method of claim 1, wherein the identifying the one or more RACH response resources comprises mapping each of the one or more RACH resources to one of the one or more RACH response resources.

6. The method of claim 1, further comprising:
identifying a location of each of the one or more RACH resources based on the identified information.

7. The method of claim 1, wherein the identifying information comprises identifying the information in a received broadcast message.

8. The method of claim 1, wherein the information is predetermined by an initiating user equipment (UE).

9. The method of claim 1, wherein the one or more RACH resources comprises at least a RACH resource used by multiple initiating user equipments (UEs).

10. The method of claim 1, further comprising:
receiving a RACH response using one of the one or more RACH response resources, wherein the RACH response comprises at least a Zadoff-Chu (ZC) sequence identification (ID) and an initiating UE ID.

11. The method of claim 1, wherein the method is used in millimeter Wave.

12. The method of claim 1, wherein the performing directional communications comprises communicating between at least two UEs in one or more directions, wherein a respective Zadoff-Chu (ZC) sequence is used for each of the one or more directions.

13. The method of claim 1, wherein the performing directional communications comprises:
transmitting a symbol with a Zadoff-Chu (ZC) sequence, or
transmitting a symbol with a ZC sequence with one or more bits.

14. An apparatus for wireless communications, comprising:
a transceiver;
a memory configured to store instructions; and
one or more processors communicatively coupled with the transceiver and the memory, wherein the one or more processors are configured to execute the instructions to:
identify information for vehicle-to-everything (V2X) communications;

initiate a random access procedure based on the identified information;
identify one or more random access channel (RACH) resources based on the information;
identify one or more RACH response resources based on the one or more RACH resources; and
perform directional communications using at least the one or more RACH resources or the one or more RACH response resources.

15. The apparatus of claim 14, wherein to identify information, the one or more processors is further configured to execute instructions to identify one or more discovery resources.

16. The apparatus of claim 15, wherein to identify the one or more RACH resources, the one or more processors is further configured to execute instructions to map the one or more discovery resources to the one or more RACH resources.

17. The apparatus of claim 15,
wherein the number of the one or more discovery resources is at least two and is more than the number of the one or more RACH resources, and
wherein the number of the one or more RACH resources is equal to or more than the number of the one or more RACH response resources.

18. The apparatus of claim 14, wherein to identify the one or more RACH resources, the one or more processors is further configured execute instructions to map the one or more discovery resources to the one or more RACH resources.

19. The apparatus of claim 14, wherein the one or more processors are configured to execute the instructions to:
identify a location of each of the one or more RACH resources based on the identified information.

20. The apparatus of claim 14, wherein to identify information, the one or more processors is further configured to execute instructions to identify the information in a received broadcast message.

21. The apparatus of claim 14, wherein the information is predetermined by an initiating user equipment (UE).

22. The apparatus of claim 14, wherein the one or more RACH resources comprises at least a RACH resource used by multiple initiating user equipments (UEs).

23. The apparatus of claim 14, wherein the one or more processors are configured to execute the instructions to:
receive a RACH response using one of the one or more RACH response resources, wherein the RACH response comprises at least a Zadoff-Chu (ZC) sequence identification (ID) and an initiating UE ID.

24. The apparatus of claim 14, wherein the apparatus is used in millimeter Wave.

25. The apparatus of claim 14, wherein to perform directional communications, the one or more processors execute instructions to communicate between at least two UEs in one or more directions, wherein a respective Zadoff-Chu (ZC) sequence is used for each of the one or more directions.

26. The apparatus of claim 14, wherein to perform directional communications, the one or more processors execute instructions to:
transmit a symbol with a Zadoff-Chu (ZC) sequence, or
transmit a symbol with a ZC sequence with one or more bits.

27. An apparatus for wireless communications, comprising:
means for identifying information for vehicle-to-everything (V2X) communications;

means for initiating a random access procedure based on the identified information;

means for identifying one or more random access channel (RACH) resources based on the information;

means for identifying one or more RACH response resources based on the one or more RACH resources; and means for performing directional communications using at least the one or more RACH resources or the one or more RACH response resources.

28. A non-transitory computer-readable medium storing computer code executable by one or more processors for wireless communications, comprising computer executable code to:

identify information for vehicle-to-everything (V2X) communications;

initiate a random access procedure based on the identified information;

identify one or more random access channel (RACH) resources based on the information;

identify one or more RACH response resources based on the one or more RACH resources; and perform directional communications using at least the one or more RACH resources or the one or more RACH response resources.

29. The method of claim 1, wherein the V2X communications comprises vehicle-to-vehicle (V2V) communications.

30. The apparatus of claim 14, wherein the V2X communications comprises vehicle-to-vehicle (V2V) communications.

31. The apparatus of claim 27, wherein the V2X communications comprises vehicle-to-vehicle (V2V) communications.

32. The non-transitory computer-readable medium of claim 28, wherein the V2X communications comprises vehicle-to-vehicle (V2V) communications.

* * * * *